United States Patent Office 3,408,922
Patented Nov. 5, 1968

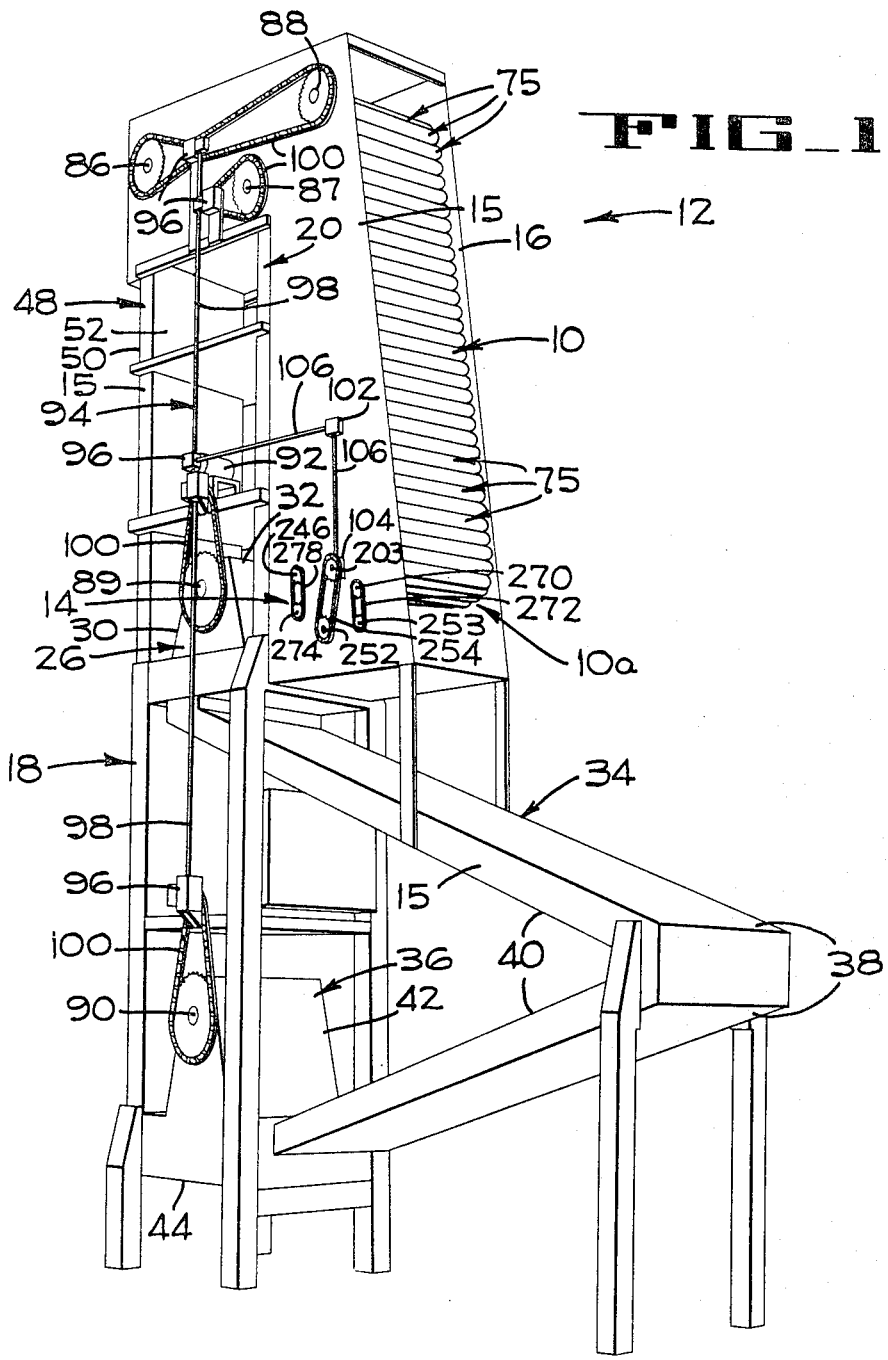

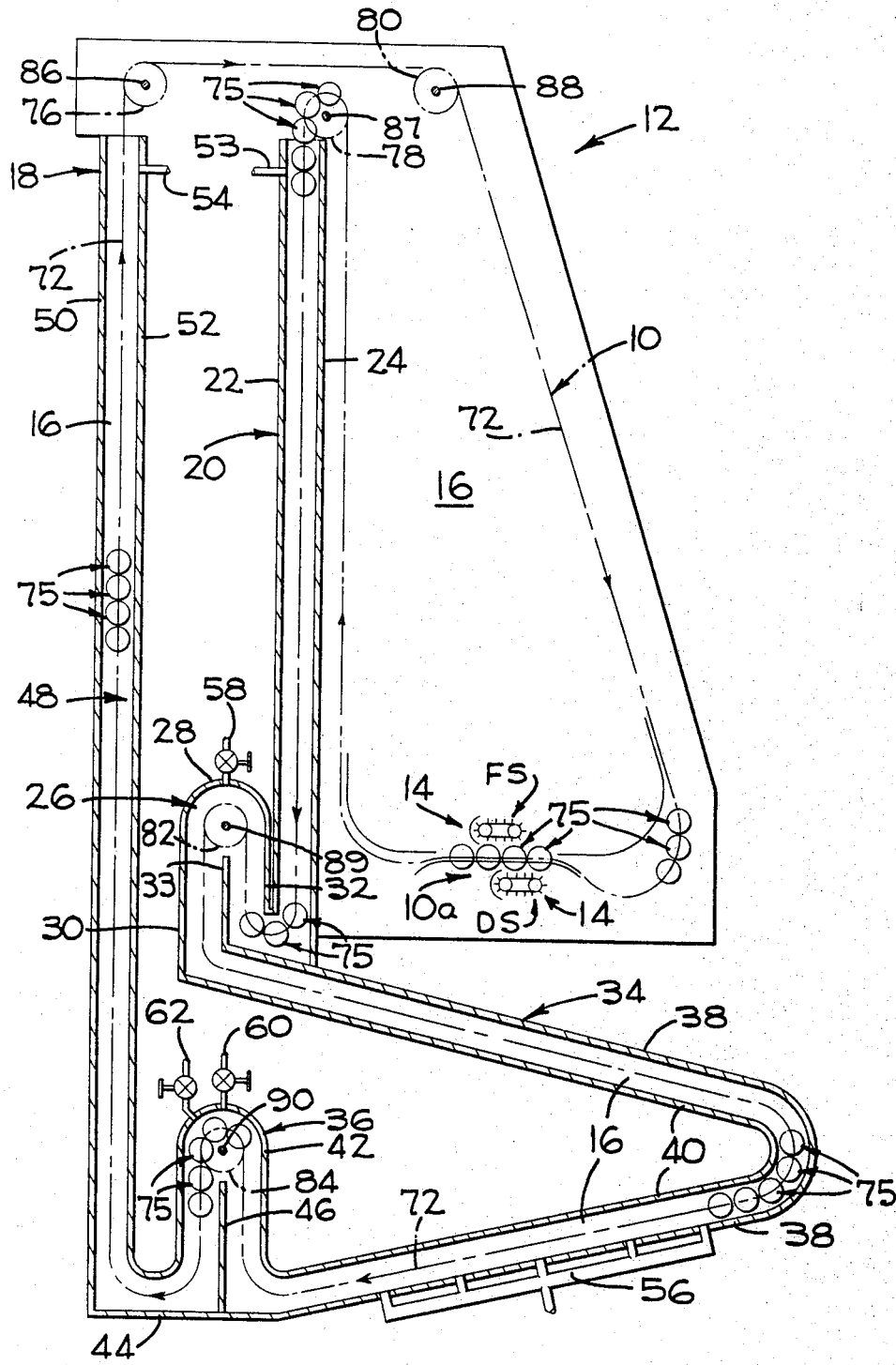
FIG_2

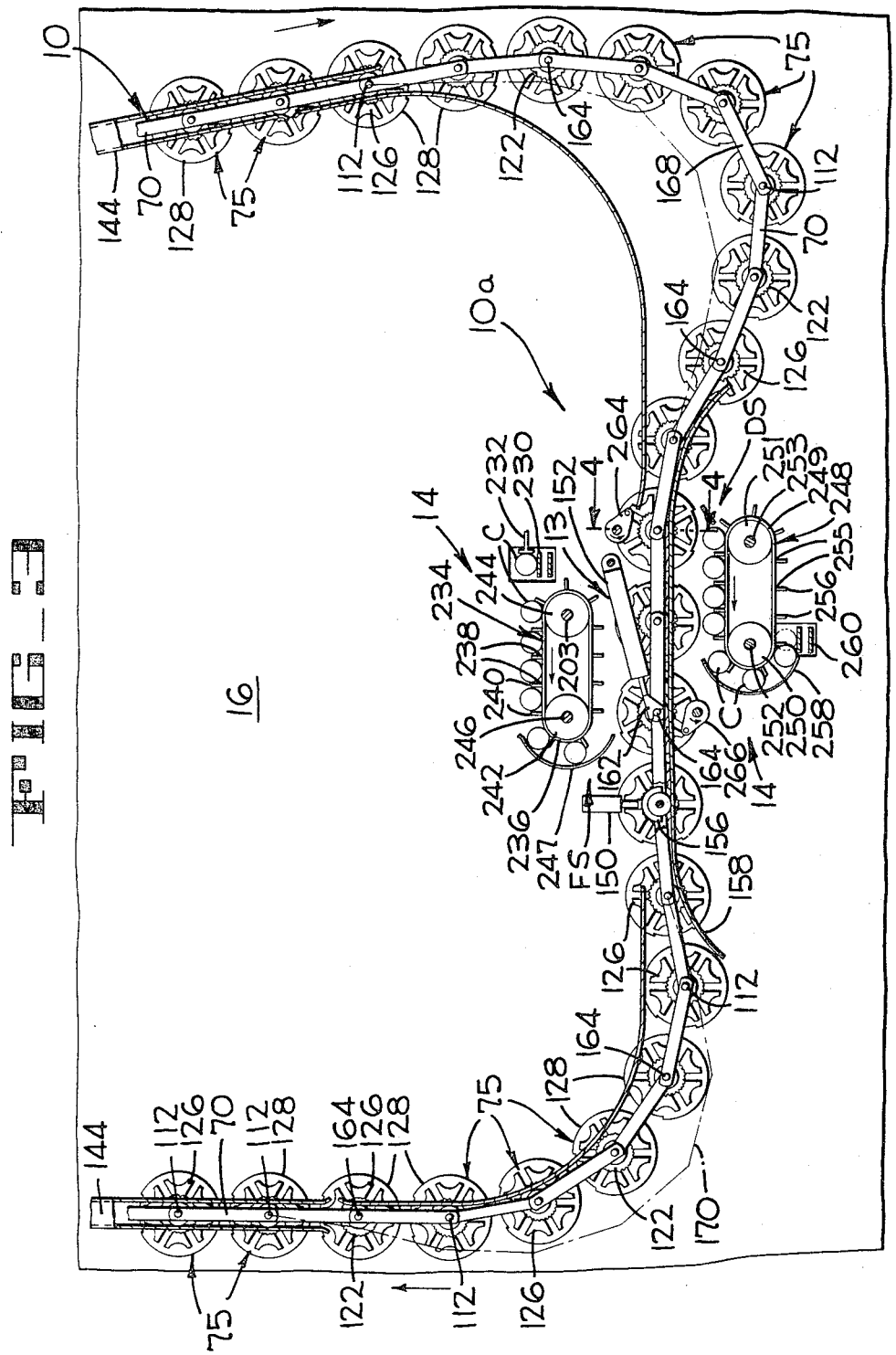

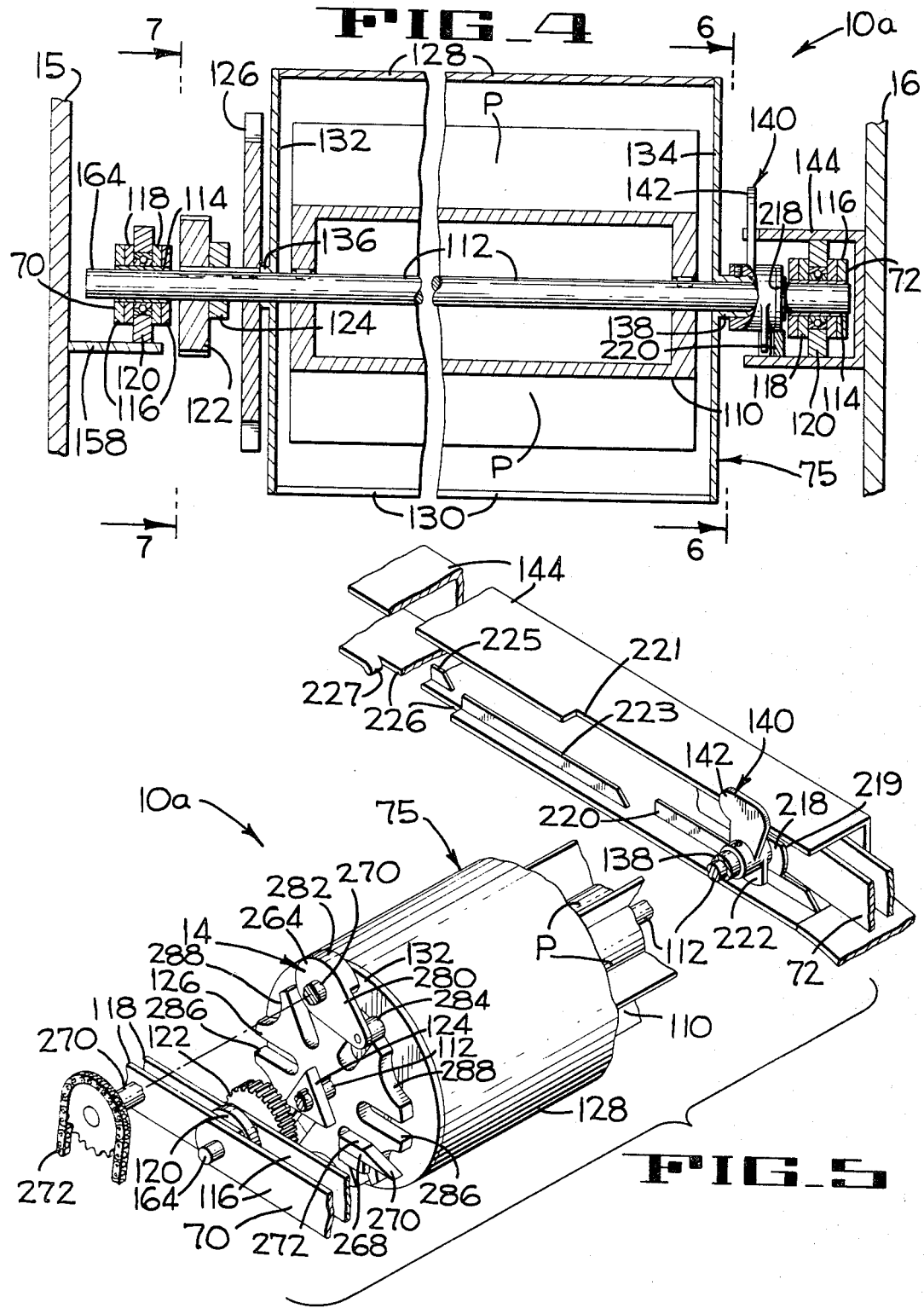

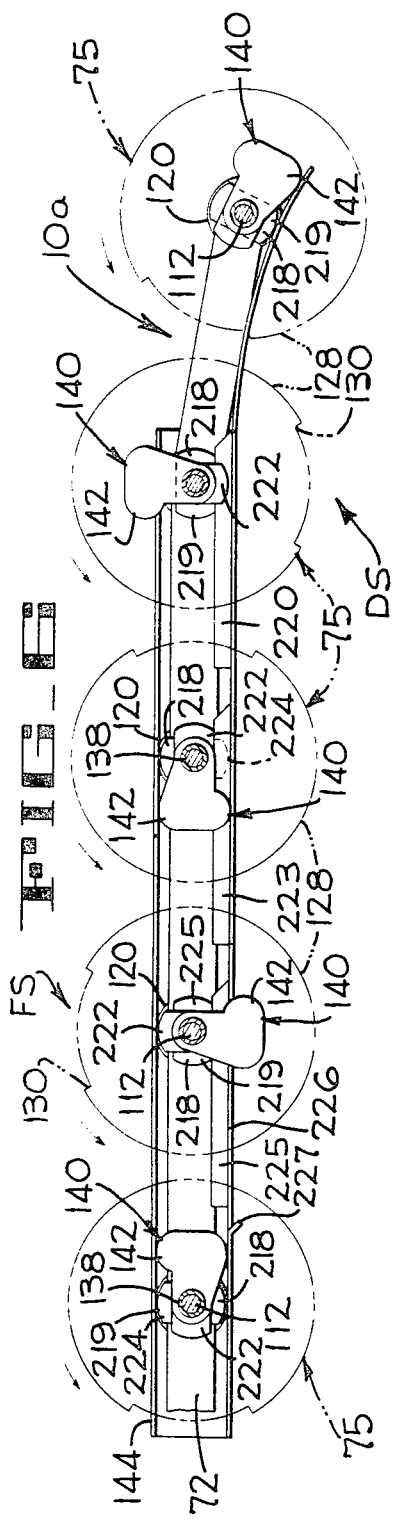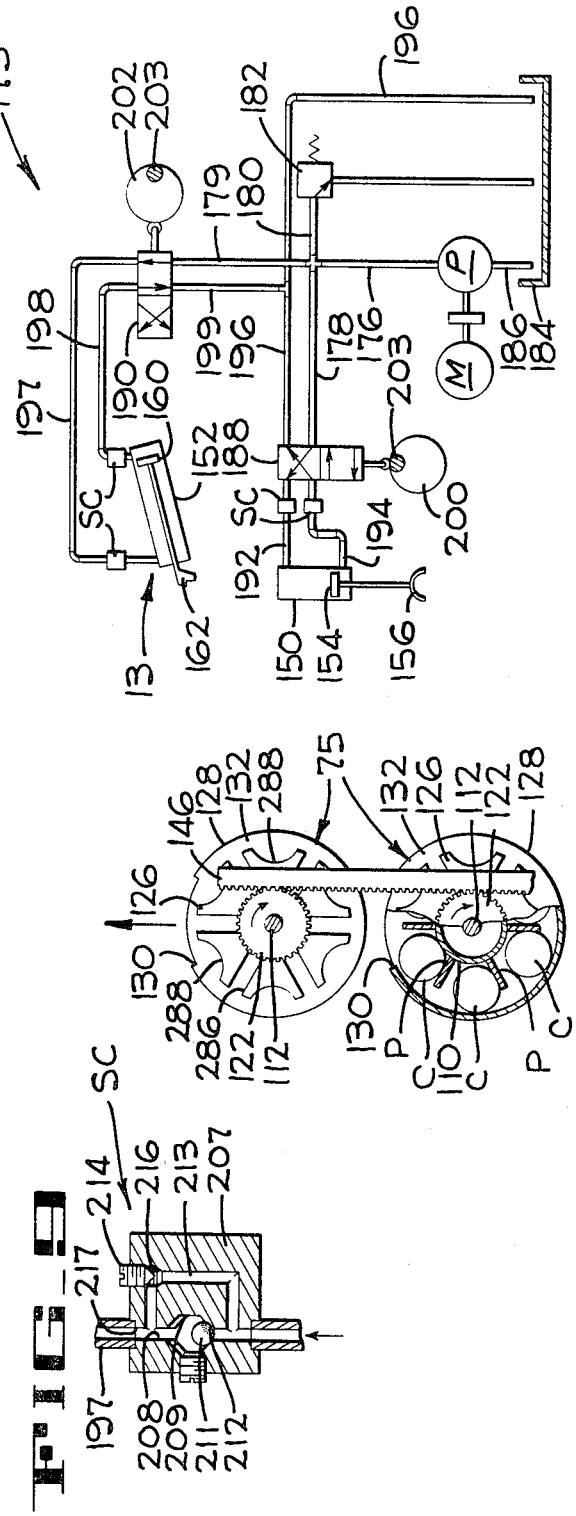

3,408,922
HYDROSTATIC COOKER CONVEYOR SYSTEM
Samuel A. Mencacci, Antwerp, and John G. Hagerborg, St. Niklaas-Waas, Belgium, assignors to International Machinery Corporation S.A., St. Niklaas-Waas, Belgium, a corporation of Belgium
Filed Mar. 14, 1967, Ser. No. 623,068
10 Claims. (Cl. 99—362)

ABSTRACT OF THE DISCLOSURE

A hydrostatic cooker having a continuously driven processing conveyor provided with a plurality of evenly spaced carriers thereon. A feed and discharge apparatus including a mechanism for intermittently driving a container transfer portion of the processing conveyor whereby containers are fed into and discharged from the carriers at the transfer portion of the conveyor when the transfer portion is stationary. The intermittent driving mechanism of the feed and discharge apparatus being effective to move the transfer portion of the processing conveyor at the same overall linear speed as the continuously driven portion of the conveyor.

Background of the invention

This invention pertains to an improved processing conveyor for a hydrostatic cooker and more particularly relates to a feed and discharge apparatus for transferring rows of containers between the apparatus and multi-pocketed carriers of the processing conveyor. The processing conveyor is designed for use in the type of housing disclosed in Mencacci Patent No. 3,252,405 which issued on May 24, 1966. The processing conveyor also includes agitating carriers of the type disclosed in our copending application Ser. No. 530,191, which application was filed on Feb. 25, 1966 and is assigned to the assignee of the present invention (now Patent No. 3,340,791 which issued Sept. 12, 1967).

Processing conveyors for hydrostatic cookers which have a plurality of evenly spaced multiple pocketed carriers thereon are well known in the art but it has been especially difficult to feed rows of containers into and discharge rows of containers from such carriers. Since the processing conveyors in most hydrostatic cookers include several vertical runs, each of which is on the order of 60 feet tall, it is not feasible to intermittently drive the entire conveyor so as to aid in the feed and discharge operations since the repeated starting and stopping of the heavily loaded conveyor would place excessively high loads on the drive motor. However, it is evident that the loading and unloading operations would be considerably simplified if the carriers were stationary during these operations.

Summary of the invention

The processing conveyor of the present invention is continuously driven throughout a majority of its length but solves the feed and discharge problem by including a transfer portion which is intermittently driven so that containers can be transferred between the carriers and the feed and discharge apparatus while the carriers are stationary. Accordingly, rows of containers are fed into and discharged from the carriers when the carriers are stationary, and yet, the major portion of the processing conveyor is continuously driven. It will be understood that when the carriers in the transfer section are stationary, a free hanging loop in the processing conveyor gradually forms downstream of the transfer portion, and that a loop upstream of the transfer portion gradually decreases in size. Conversely, when the intermittent driving mechanism is actuated, the upstream loop increases in size and the downstream loop decreases in size.

Brief description of drawings

FIGURE 1 is a perspective of a hydrostatic coker which utilizes the improved processing conveyor of the present invention, said view illustrating the drive for the conveyor and for the feed and discharge apparatus.

FIGURE 2 is a diagrammatic central vertical section taken through the hydrostatic cooker of FIGURE 1.

FIGURE 3 is an enlarged section illustrating the feed and discharge apparatus at a point in the cycle of operation where the transfer portion of the processing conveyor is locked in stationary position immediately before being indexed one carrier spacing to the left.

FIGURE 4 is an enlarged vertical section through one of the carriers taken substantially along the lines 4—4 of FIGURE 3.

FIGURE 5 is a perspective with parts broken away illustrating the structure for indexing the carrier drum and the structure for indexing the container supporting star wheel within the drum.

FIGURE 6 is a vertical section taken substantially along lines 6—6 of FIGURE 4 illustrating the structure for rotating the carrier drums, said drums being shown in phantom.

FIGURE 7 is the vertical section taken substantially along lines 7—7 of FIGURE 4 illustrating two carriers and the manner in which the carrier star wheels are rotated when moving along a vertical path thereby agitating the contents of the containers.

FIGURE 8 is a diagram of the hydraulic system used to drive the intermittent driving mechanism.

FIGURE 9 is a diagrammatic vertical central section of a speed control valve used in the hydraulic system of FIGURE 8.

Description of preferred embodiment

The improved endless processing conveyor 10 (FIGS. 1 and 2) of the present invention is continuously driven through the processing chambers of a hydrostatic cooker 12, except for a short transfer portion 10a which is intermittently driven by an intermittent drive mechanism 13 (FIG. 3) of a container feeding and discharging apparatus 14.

The hydrostatic cooker 12 includes a pair of spaced vertical side walls 15 (FIG. 1) and 16 (FIG. 2) that are supported in spaced parallel relation by a frame 18. A relatively short vertically extending inlet housing 20 is open at its upper and lower ends and is defined by portions of the walls 15 and 16 which are welded in fluid-tight engagement to transversely extending spaced walls 22 and 24. The open lower end of the inlet housing 20 communicates with a first air lock housing 26 which is defined by a dome 28, and side walls 30 and 32, all of which are welded to the side walls 15 and 16 in fluid-tight engagement. A centrally disposed vertical partition 33 is welded to the side walls 15 and 16 and extends upwardly with the first air lock housing 26 to divide the air lock housing into two legs.

A downwardly inclined sterilizing housing 34 has its upper end connected to the first air lock housing 26 and its lower end connected to a second air lock housing 36. The sterilizing housing 34 is defined by an outer wall 38 and an inner wall 40 welded to the side walls 15 and 16. The second air lock housing 36 is defined by an inverted U-shaped wall 42 and a floor 44 with a partition 46 extending upwardly therefrom and welded to the side walls 15 and 16. The second air lock housing 36 communicates with an elongated vertically extending outlet housing 48 which is defined by walls 50 and 52 welded to the side walls 15 and 16.

The inlet housing 20, sterilizing housing 34, and outlet housing 48 are filled with water through conduits 53 and 54. The water in the sterilizing housing 34 is heated by steam from the manifold 56 to a temperature of about 250° F. The water in the inlet housing 20 is heated and maintained at temperatures which gradually increase from about 200° F. at the upper end thereof to about 240° F. at its lower end. Similarly, the temperature of the water in the outlet housing 48 is controlled to gradually decrease from about 240° F. at its lower end to about 200° F. at its upper end.

It will be recognized that if the water temperature at any level in the cooker exceeds the boiling point at that level, that the water will flash into steam and accordingly will rise in the chamber in which this condition occurs thus causing the hydrostatic system to become unbalanced with the result that much of the water is blown out the upper end of the associated inlet housing 20 or outlet housing 48. In order to minimize this danger, air is directed into the air lock housings 26 and 36 through valve conduits 58 and 60, respectively, at pressures which will support the height of water in the inlet housing and outlet housing, respectively. If desired, cooling water may be sprayed through a valve conduit 62 into the second air lock housing 36 to aid in cooling the containers and condensing steam that enters the housing 36.

The processing conveyor 10 of the present invention is trained through the processing chambers of the cooker 12 and is continuously driven in the direction indicated by the arrows in FIGURE 2 except for the short transfer portion 10a which is intermittently driven to aid in the container feeding and discharging operations.

The processing conveyor 10 includes two spaced parallel endless chains 70 and 72 (FIGS. 4 and 5) which have a plurality of evenly spaced agitating carriers 75 pivotally supported therebetween. The chains 70 and 72 are trained around spaced pairs of upper sprockets 76, 78 and 80 (FIG. 2) around a pair of sprockets 82 disposed in the first air lock housing 26, and around another pair of sprockets 84 disposed in the second air lock housing 36. The sprockets 76, 78, 80, 82 and 84 are keyed to shafts 86, 87, 88, 89 and 90, respectively, which shafts are journalled in the side walls 15 and 16. These shafts are all continuously driven by a motor 92 (FIG. 1) through a drive system 94 which includes a series of gear boxes 96, interconnecting shafts 98, and associated chain drives 100. It will also be noted that the drive system 94 includes gear boxes 102 and 104, and interconnecting shafts 106 which supply power to the container feeding and discharging apparatus 14.

Each agitating carrier 75 (FIGS. 4 and 5) includes a pocketed star wheel or reel 110 which is keyed to a shaft 112. As indicated, six pockets P are the preferred number of pockets in each star wheel, and it will be understood that each pocket will accommodate a row of containers C (FIGS. 3 and 7) about six feet long.

The opposite ends of the shaft 112 are rotatably received within tubular bushings 114 (FIG. 4) which define the pivot pins for the associated wide links 116, narrow links 118, and rollers 120 of the chains 70 and 72. A pinion 122, star wheel aligning cam 124 in the shape of an equilateral triangle, and a Geneva drive gear 126 are also keyed to the shaft 112.

In order to maintain the rows of containers C within the pockets P during their travel through the cooker, a cylindrical drum 128 having an elongated feed and discharge slot 130 therein is concentric with and positioned around the pocketed star wheel 110 in container confining relationship. Circular end plates 132 and 134 are welded to the ends of the drum 128 and include hubs 136 and 138 (FIG. 4), respectively, which are rotatably mounted on the shaft 112. A drum positioning cam 140 is keyed to the hub 138 and includes a main lobe 142 which is slidably received between the walls of a channel cam track 144. The cam track 144 is secured to the wall 16 and rotatably receives the rollers 120 of the chain 72, and slidably receives the lobe 142 for the purpose of guiding the chain 72 and maintaining feed and discharge slots 130 of the drums 128 of each carrier 75 disposed opposite the next adjacent drum as indicated in FIGURE 7 so that the containers will be retained within the drum. The cam track 144, and a drum similar cam track 145 for the chain 70, extends throughout substantially the entire path of travel of the processing conveyor 10 except for the areas adjacent the transfer section 10a of the conveyor 10, and in the areas adjacent the conveyor sprockets, which last mentioned areas are partially cut away to accommodate the sprockets.

As indicated in FIGURE 7, a stationary rack 146 extends through the processing chambers of the hydrostatic cooker 12 and meshes with the pinions 122 of the carriers 75 to rotate the pocketed star wheels 110 and agitate the contents of the containers as they are advanced through the heat treatment mediums in the hydrostatic cooker 12.

The feeding and discharging apparatus 15 includes the intermittent driving mechanism 13 (FIGS. 3 and 8) for intermittently driving the transferring section 10a of the conveyor 10. The intermittent driving mechanism 13 comprises a hydraulic carrier locking cylinder 150 and a container advancing hydraulic cylinder 152. Although only one locking cylinder and one advancing cylinder are shown associated with the conveyor chain 70, it will be understood that it is within the scope of the invention to include similar cylinders associated with the conveyor chain 72. The locking cylinder 150 includes a piston 154 with a U-shaped locking arm 156 secured to its lower end which when in its active locking position engages one of the rollers 120 and locks it firmly against a lower guide plate 158 to hold the carriers 75 in the feed portion 10a stationary. After one carrier has been loaded with containers to be processed, and all the processed containers in another carrier have been discharged therefrom, the piston 154 raises the U-shaped arm 156 from the associated roller and immediately thereafter the container advancing cylinder 152 is activated.

Activation of the cylinder 152 causes the piston 160 thereof to move from the retracted to the extended position causing a pushing finger 162 on the end of the piston 160 to engage the end portion 164 of the associated shaft 112 to advance the transfer portion 10a of the conveyor 10 to the left (FIG. 3) a distance equal to the spacing between adjacent carriers on the conveyor 10. Upon completion of such movement, the locking cylinder 150 again locks the carriers 75 in the transfer position 10a of the conveyor 10 in fixed position while the piston 160 of the container advancing cylinder 152 moves behind the shaft extension 164 of the next following carrier 75.

Since the major portion of the conveyor 10 is continously driven and since the portion 10a is intermittently driven to aid in the feed and discharge operation, it will be appreciated that a loop 168 (FIG. 3) will be formed downstream of the mechanism 13 when the portion 10a is held stationary, and that a similar loop 170 will be formed upstream of the mechanism 13 when the advancing cylinder moves the section 10a one carrier space to the left (FIG. 3).

A hydraulic system 175 (FIG. 8) is provided for actuating the cylinders 150 and 152 in timed relation with each other and with the other parts of the feeding and discharging apparatus 14. The system 175 includes a motor M which drives a pump P to advance high pressure hydraulic fluid through a high pressure conduit 176 which includes branch conduits 178, 179 and 180. The conduit 180 communicates with a pressure release valve 182 which will open if the pressure in the conduit 176 is excessive and will direct the fluid into a sump 184 for return to the pump P through conduit 186.

The branch conduit 178 communicates with a four-way cam operated, spring return valve 188, while the branch conduit 179 communicates with a similar four-way valve 190. Both valves are of well known design and are alternately indexed in cross passage and parallel passage positions. When the parts are positioned as illustrated in FIGURES 3 and 8, high pressure fluid flows through the valve 188 which is in the cross passage position, through a conduit 192 having a speed control valve SC therein, and into the upper end of the locking cylinder 150 thereby moving its piston 154 and the locking arm 156 downwardly into locking engagement with the associated carrier 75. Hydraulic fluid from the lower end of the cylinder 150 flows through a conduit 194 and through a speed control valve SC therein, through a cross passage in the valve 188 and through a return conduit 196 to the sump 184.

High pressure fluid from the branch conduit 179 flows through a parallel passage in the valve 190, through a conduit 197 having a speed control valve SC therein, and into the lower end of the carrier advancing cylinder 152 thereby holding the piston 160 in the retracted position. Hydraulic fluid in the other end of the cylinder 152 flows through a return conduit 198 having a speed control valve SC therein, through a parallel passage in the valve 190 and returns to the sump 184 through a conduit 199 and the conduit 196.

After the carrier 75 in the feeding station FS (FIG. 3) has been loaded and the carrier in the discharge station DS has been unloaded, cams 200 and 202 (FIG. 8) keyed to a shaft 203 of the feeding and discharging apparatus 14 shift the valve 188 from the cross passage to the parallel passage position, and shift the valve 190 from the parallel passage to the cross passage position thereby reversing the direction of flow of the hydraulic fluid in these two cylinders. The rate of flow of hydraulic fluid into the cylinders 150 and 152 is such that the piston 154 of cylinder 150 first rapidly raises to unlock the transfer portion 10a of the conveyor and thereafter the piston 160 of the carrier advancing cylinder 152 rapidly moves the carrier which has just been loaded into position to be engaged and locked by the locking cylinder 150. The speed of movement of the piston rod 160 is controlled by the associated speed control valves SC so that an empty carrier is moved into the feed station FS before the next row of containers is released by the feed and discharge apparatus 14 for acceptance by the carrier at the station FS.

The several speed control valves SC (FIG. 9) are identical in construction and accordingly the description of one will suffice for all. Each speed control valve SC comprises a housing 207 having a straight line passage 208 therethrough. An elongated portion 209 of the passage 208 has a ball check valve 211 therein which rests against a seat 212 to prevent flow of fluid downwardly (FIG. 9) through the passage 208 but permits unrestricted flow upwardly (FIG. 9) through the passage 208. A U-shaped control passage 213 in the housing 207 bypasses the ball valve 211 and communicates with opposite ends of the straight-line passage 208. An adjustable needle valve 214 cooperates with a frusto-conical seat 216 of the control passage to restrict the downward (FIG. 9) flow of fluid therethrough to thereby control the rate of travel of the piston of the associated hydraulic power cylinder. It will be understood that the needle valve 214 of each speed control valve SC will be adjusted so as to achieve the desired rate of travel of the piston of the associated power cylinder. It will also be understood that the speed control valves SC are all positioned so that the upper port 217 rather than the lower port, is connected to the associated power cylinder.

In order to position the elongated slot 130 in each drum 128 of each agitating carrier 75 in position to permit rows of containers to be fed into and discharged from the carriers when at the feed station FS and discharge station DS, the cam track 144 is cut away as indicated in FIGURES 5 and 6 to permit the drum 128 of each carrier to rotate. As the intermittent drive mechanism 13 moves one carrier to the left (FIGS. 5 and 6) into the discharge station DS, one ear 218 of the substantially rectangular cam block 219 of the drum positioning cam 140 engages a camming bar 220 and pivots the drum through 90° in a counterclockwise direction. At this time, the main lobe 142 projects upwardly through a notch 221 in the channel cam track 144 and one edge of the cam block 219 slidably engages the upper surface of the camming bar 220 to prevent further rotation of the drum while in the discharge station.

After all the containers have been discharged from the carrier at the discharge station DS, the carrier is moved to the left causing the block 219 to slide off the end of the camming bar 220 and causing an ear 222 of the drum positioning cam 140 to engage a second camming block 223 and shift the drum slot another 90 degrees in a counterclockwise direction. It will be noted that the cam block 219, main lobe 142 and ear 222 lie in vertical planes which are spaced from each other.

The next intermittent movement of that carrier causes the carrier to move into the feed station FS at which time the other ear 224 of the cam block 219 engages another camming bar 225 and shifts the drum slot 130 another 90 degrees so that it is positioned upwardly. The slot is held in this position while in the feeding station FS by a flat surface of the cam block 219 which rides along the upper surface of the camming bar 225. At this time, the main lobe 142 enters a notch 226 in the lower portion of the channel cam track 144. After the carrier at the feed station FS has been filled, it is moved out of the feed station at which time the main lobe 142 engages an edge 227 of the notch 226 thus shifting the drum another 90 degrees in a counterclockwise direction at which time it assumes its original position with the lobe 142 riding between two flanges of the channel cam track 144 to prevent further rotation of the drum during movement through the processing chambers of the hydrostatic cooker.

The feeding and discharging apparatus 14 includes any suitable type of continuously driven endless feed conveyor 230 (FIG. 3) with means for forming a continuously moving series of containers into groups of containers that are about six feet long, which groups are each termed a "stick" of containers, and for thereafter periodically pushing each stick of containers off the feed conveyor 230 by a transfer device 232. Since the feed conveyor and the transfer device form no part of the present invention, they have not been described in detail. If a detailed description of these parts is desired, reference may be had to Patent No. 3,067,850 which issued to John F. French on Dec. 11, 1962.

An endless stick conveyor 234 is mounted immediately adjacent the conveyor 230 in position to receive rows of containers from the conveyor 230. The conveyor 234 includes an endless belt 236 divided into a plurality of evenly spaced pockets 238 by bars 240 secured to the belt. The belt is trained around a pair of spaced rollers 242 and 244 keyed to shafts 246 and the shaft 203 which has the valve opening cams 200 and 202 (FIG. 8) of the hydraulic system 175 keyed thereon. The shafts 203 and 246 are journalled in the walls 15 and 16 (FIG. 1) of the frame 18, the shaft 203 being continuously driven from the gear box 104. A sheet metal retainer 247 (FIG. 3) of generally semi-cylindrical shape is secured between the walls 15 and 16 and serves to guide the rows of containers around the roller 242 into discharge position therebelow.

The rate of movement of the conveyor 234 is such that six rows of containers are discharged from adjacent pockets 238 of the conveyor 234 into the six pockets P (FIG. 5) of the carrier which is positioned at the feed station FS while that carrier is locked in fixed position. It will be understood that the intermittent feed mechanism 13 then unlocks and moves another carrier into feed position before the next or 7th row is in position to be discharged from the stick conveyor 234 into the carrier at the feed station.

A stick discharging conveyor 248, which is quite similar to the stick feed conveyor 234, is positioned below the processing conveyor 10 at the discharge station DS and receives six rows of processed sticks from each carrier 75 when indexed at the discharge station DS. The stick discharge conveyor 248 comprises an endless belt 249 trained around rollers 250 and 251 which are keyed to shafts 252 and 253, respectively, which shafts are journalled in the walls 15 and 16 of the cooker. As indicated in FIGURE 1, the shafts 203 and 252 are interconnected by chain drive 254 and, accordingly, the conveyor 248 is continuously driven at the same speed as the stick feed conveyor 234.

The belt 249 is divided into equally spaced pockets 255 by bars 256 so that the processed sticks of containers discharged from the carriers at the feed station can each be received in one of the pockets 255. The sticks of containers are then moved by the discharge conveyor 248 within a generally semi-cylindrical guide 258 and are discharged one stick at a time onto an endless discharge conveyor 260 of well known design for removal from the hydrostatic cooker 12.

Since six rows of containers must be fed into, and be discharged from each carrier 75 when the carrier is positioned at the feed station FS and discharge station DS, respectively, Geneva drive mechanisms 264 and 266 are positioned at the discharge station DS and feed station FS, respectively. In order for the Geneva drive mechanisms 264 and 266 to register properly with the Geneva gear 126 (FIG. 5) on each carrier shaft 112, it will be appreciated that the reel 110 must be accurately positioned as it moves into the discharge station DS and again as it moves into the feed station FS. Accordingly, a pair of fixed indexing tracks 268 (only the track at the discharge station DS being shown) are provided for engaging the triangular cams 124 on the reel shaft 112 of each carrier shortly before it enters the feed and discharge stations. Each indexing track 268 includes an upwardly inclined portion 270 and a horizontal portion 272 which cooperate with any one of the three side walls of the associated triangular cam 124 to position one reel pocket P in position to receive or discharge a stick of containers as it is moved into the feed or discharge station. The triangular cam 124 and track 268 also orients the Geneva gear 126 so that it will register with the appropriate Geneva drive mechanism 264 or 266.

The Geneva drive mechanism 264 is keyed to a shaft 270 that is journalled in the wall 15 and is connected to conveyor shaft 253 (FIG. 1) by a chain drive 272, the sprocket ratio of the chain drives 272 being such that the mechanism 264 is driven one revolution each time the stick discharge conveyor 242 moves a distance equal to the spacing of the pockets 255. Similarly, the Geneva drive mechanism 266 at the feed station FS is keyed to a shaft 274 (FIG. 3) journalled in the wall 15 and connected to the shaft 246 (FIG. 1) by a chain drive 278 arranged to drive the mechanism 266 one revolution each time the stick feed conveyor 234 is driven one pocket length.

The Geneva drive mechanism 264 (FIG. 5) is of well-known design and includes a drive arm 280 having a semi-cylindrical locking hub 282 concentric with the shaft 270 and a drive pin 284 disposed from the shaft 270. After a carrier has been indexed into the discharge station DS and the reel 110 thereof has been properly positioned by the triangular cam 124, rotation of the drive mechanism 264 causes the drive pin 284 to enter one of six radially extending elongated drive slots 286 in the Geneva gear 126 thereby indexing the reel 60 degrees placing another pocket P in position to discharge its stick of containers into another pocket 255 of the discharge conveyor 248. After the reel 110 has completed its indexing movement, the new pocket P is held in discharge position by the locking hub 282 which enters one of six equally spaced semi-cylindrical locking grooves 288 in the Geneva gear 126 and remains therein until the pin 284 enters the next adjacent radial slot 286 to index another pocket P into discharge position. After all six pockets of the carrier 75 in the discharge station DS have been indexed into discharge position as above described, the intermittent drive mechanism 13 is activated to move another carrier into the discharge station at which time the above described carrier unloading operation is repeated.

Since the Geneva drive mechanism 266 at the feed station FS is identical and operates in the same way as the Geneva drive mechanism 264 at the discharge station DS, the mechanism 266 will not be described in detail.

It will be understood, however, that the mechanism 266 indexes each of the six carrier pockets P of each carrier in position to receive a stick of containers from the stick feed conveyor 234 and that the filled carrier is then advanced out of the feed station FS and an empty carrier is moved into the feed station before the seventh stick of containers is released from the feed conveyor 234.

From the foregoing description it will be apparent that the improved conveying system of the present invention includes an endless processing conveyor which is continuously driven through a major portion of its length and which includes a minor portion that is intermittently driven to move carriers into feed and discharge stations where they are filled and emptied, respectively, while stationary.

Although the best mode contemplated for carrying out the present invention has been herein shown and described, it will be apparent that modifications and variations may be made without departing from what is regarded to be the subject matter of the invention as set forth in the appended claims.

We claim:

1. A conveying apparatus comprising an endless processing conveyor having a major processing portion and a minor container transfer portion, a plurality of evenly spaced carriers supported by said endless conveyor, first drive means connected to said major portion of said conveyor for continuously driving said major portion, intermittent drive means operatively connected to said transfer portion of said conveyor for intermittently driving said transfer portion whereby each carrier momentarily stops at a transfer position, and container transfer means for transferring a container between said transfer means and a carrier in the transfer portion of the conveyor when the carrier is momentarily stopped at said transfer position.

2. An apparatus according to claim 1 wherein said transfer position includes a feed position spaced from a discharge position and wherein said container transfer means includes feed means for feeding a container into each carrier when the carriers are momentarily stopped one at a time at the feed transfer position, and discharge means spaced from said feed means for discharging a container from other ones of said carriers when the other carriers are momentarily stopped one at a time at the discharge transfer position.

3. An apparatus according to claim 2 wherein each carrier is an agitating carrier, and wherein each agitating carrier comprises a drum having an elongated feed and discharge slot therein, and a reel journalled within said drum and having a plurality of pockets therein with each pocket adapted to receive a row of containers.

4. An apparatus according to claim 3 wherein said feed means comprises a continuously driven pocketed stick conveyor for advancing rows of containers along a predetermined path, means responsive to the intermittent movement of a carrier into transfer feed position for moving said slot into position to receive rows of containers from said stick conveyor, reel indexing means for intermittently driving said reel in timed relation with said stick feed conveyor to move each pocket one at a time into position to receive a row of containers from said stick conveyor to fill all of said pockets while said carrier is momentarily stopped at said transfer position.

5. An apparatus according to claim 3 wherein said discharge means comprises a continuously driven pocketed stick discharge conveyor for receiving rows of processed containers from the carrier at said discharged transfer position, means responsive to the intermittent movement of a carrier into discharge transfer position for moving said slot in position to discharge rows of containers from said carrier into said stick discharge conveyor, reel indexing means for intermittently driving said reel in timed relation with said stick discharge conveyor to move each pocket one at a time into position to discharge a row of processed containers into said stick conveyor to empty all of said pockets while said carrier is at said discharge transfer position.

6. An apparatus according to claim 4 wherein said discharge means comprises a continuously driven pocketed discharge conveyor for receiving rows of containers from the carriers, means responsive to the intermittent movement of the carrier into transfer discharge position for moving said slot into position to discharge rows of containers from said stick discharge conveyor, reel indexing means for intermittently driving said reel in timed relation with said stick discharge conveyor to move each pocket one at a time into position to discharge a row of processed containers from each pocket of said reel into said stick discharge conveyor to empty said pockets while said carrier is momentarily stopped at said discharge transfer position.

7. An apparatus according to claim 6 and additionally comprising a plurality of processing chambers having heat treatment mediums therein, and means for guiding the processing portion of the processing conveyor through said chambers.

8. An apparatus according to claim 1 wherein each of said carriers is provided with a plurality of pockets, and wherein said container transfer means is effective to transfer containers between said transfer means and all pockets of a carrier and when the carrier is momentarily stopped at said transfer position.

9. An apparatus according to claim 1 wherein each carrier is an agitating carrier; said agitating carrier comprising a drum having an elongated feed and discharge slot therein, and a reel journalled within said drum and having a plurality of pockets therein with each pocket adapted to receive a row of containers; said container transfer means comprising means for rotating said drum to position said slot in article transfer position, means for rotating said reel while said carrier is momentarily stopped at said transfer position to move the pockets one at a time into alignment with said slot, and transfer conveying means driven in timed relation with said reel driving means for maintaining rows of containers in spaced relation from each other and for transferring one row of containers at a time through said slot between said transfer conveying means and said reel pockets while said carrier is momentarily held stationary in said transfer position.

10. An apparatus according to claim 1 and additionally comprising a plurality of processing chambers having heat treatment mediums therein, and means for guiding the processing portion of said processing conveyor through said chambers.

References Cited

UNITED STATES PATENTS

| 2,695,555 | 11/1954 | Carvallo | 99—362 |
| 2,719,478 | 10/1955 | Van Der Winden | 99—360 |
| 2,806,423 | 9/1957 | Van Der Winden | 99—362 |
| 3,067,850 | 12/1962 | French | 198—24 |

FOREIGN PATENTS

| 645,824 | 11/1950 | Great Britain. |

BILLY J. WILHITE, *Primary Examiner.*